(12) United States Patent
Moss

(10) Patent No.: US 6,536,818 B1
(45) Date of Patent: Mar. 25, 2003

(54) BUMPER FOR A MOTOR VEHICLE

(76) Inventor: Nathan S. Moss, 61 Stonegate Dr., Staten Island, NY (US) 10304

( * ) Notice: Subject to any disclaimer, the term of this patent is extended or adjusted under 35 U.S.C. 154(b) by 0 days.

(21) Appl. No.: 10/152,483

(22) Filed: May 21, 2002

(51) Int. Cl.[7] ............................................. B60R 19/32
(52) U.S. Cl. ..................... 293/134; 293/102; 293/107; 293/132; 293/133
(58) Field of Search .................. 298/102, 107, 298/129, 132, 133, 134, 135

(56) References Cited

U.S. PATENT DOCUMENTS

| | | | |
|---|---|---|---|
| 3,754,784 A | * 8/1973 | Heinig et al. ............... | 293/134 |
| 3,759,558 A | 9/1973 | Komatsu | |
| 3,814,219 A | * 6/1974 | Fannin et al. ............... | 293/134 |
| 3,833,248 A | 9/1974 | Wossner et al. | |
| 3,947,061 A | 3/1976 | Ellis | |
| 4,046,361 A | 9/1977 | Morse | |
| 4,054,312 A | * 10/1977 | Strader, Jr. ................... | 293/134 |
| 4,061,386 A | * 12/1977 | Chupick ...................... | 293/134 |
| 4,097,080 A | * 6/1978 | Petry ........................... | 293/134 |
| 4,509,781 A | * 4/1985 | Dick et al. ................... | 293/136 |
| 4,546,959 A | 10/1985 | Tanno | |
| 4,830,417 A | * 5/1989 | Bates et al. .................. | 293/132 |
| 4,932,697 A | 6/1990 | Hun | |
| 5,011,205 A | 4/1991 | Liu | |
| 5,029,919 A | 7/1991 | Bauer | |
| 5,031,947 A | 7/1991 | Chen | |
| 5,101,927 A | 4/1992 | Murtuza | |
| 5,370,429 A | 12/1994 | Reuber et al. | |
| 5,497,303 A | * 3/1996 | Decinti et al. ............... | 362/505 |
| 5,593,195 A | 1/1997 | Lei | |
| 5,951,073 A | 9/1999 | Hall | |
| 5,959,552 A | 9/1999 | Cho | |
| 5,967,573 A | 10/1999 | Wang | |
| 6,189,941 B1 | 2/2001 | Nohr | |
| 6,343,821 B2 | 2/2002 | Breed | |

* cited by examiner

Primary Examiner—D. Glenn Dayoan
Assistant Examiner—Lori L Coletta
(74) Attorney, Agent, or Firm—Richard L. Miller

(57) ABSTRACT

A bumper for a motor vehicle that includes a frame attached to the motor vehicle, a covering that covers the frame, and at least one set of self contained gas springs that are for attaching to the motor vehicle. The at least one set of self contained gas springs supporting the frame allows transition of acceleration to be smoothed, both upon initial contact of the bumper until its maximum compression, and between maximum compression of the bumper and end-deformation of the motor vehicle, while lowering deformation to the motor vehicle and shock to its passengers and lowering overall compression distance in the bumper to save the motor vehicle from further damage. The at least one set of self contained gas springs raises deceleration of impact during compression of the bumper, but lowers deceleration during deformation of the motor vehicle.

10 Claims, 1 Drawing Sheet

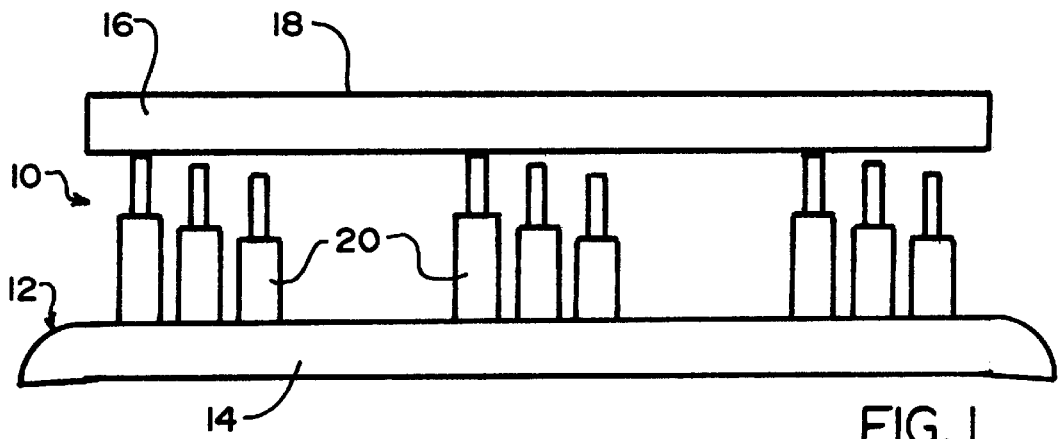
FIG. 1
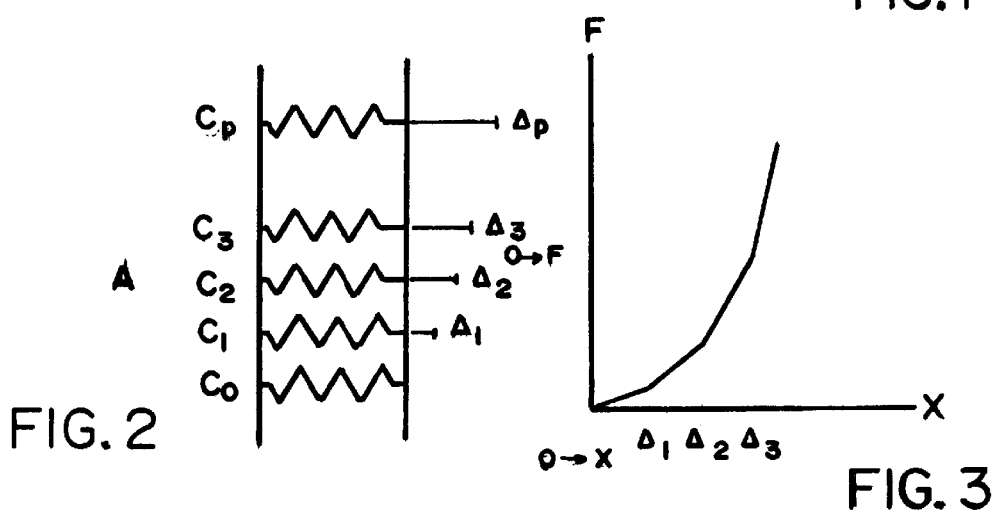
FIG. 2
FIG. 3
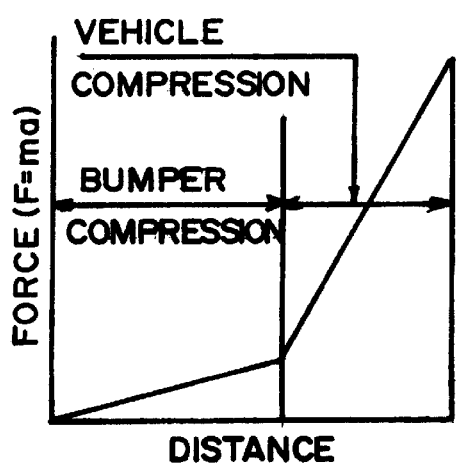
PRIOR ART
FIG. 5
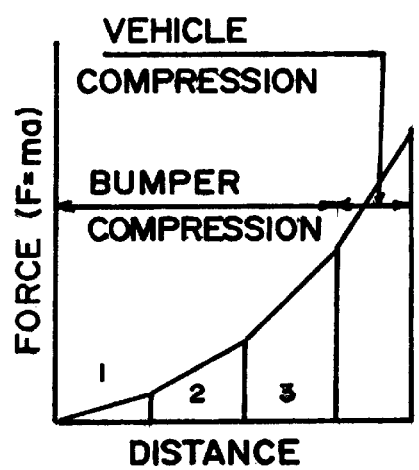
FIG. 4

BUMPER FOR A MOTOR VEHICLE

BACKGROUND OF THE INVENTION

1. Field of the Invention

The present invention relates to a bumper. More particularly, the present invention relates to a bumper for a motor vehicle.

2. Description of the Prior Arts

In the United States, automobile front and rear bumpers are only required to withstand a 5 MPH incident without any damage to the bumper itself.

Thus, there exists a need to design a bumper for the automotive industry that will be resistant to damage in a motor vehicle accident greater than the standard 5 MPH speed. Concurrently, this bumper design will reduce the deceleration felt by passengers during a collision.

Numerous innovations for bumpers have been provided in the prior art that will be described. Even though these innovations may be suitable for the specific individual purposes to which they address, however, they differ from the present invention.

A FIRST EXAMPLE, U.S. Pat. No. 3,759,558 to Komatsu teaches a shock absorbing device for vehicles which includes a front bumper, a rear bumper, a link rod means connecting said front and rear bumpers, and a pair of hydraulic damper means inserted between each end of the link rod means and the corresponding bumper, respectively. Upon application of a shock to one of the bumpers, both the shocked bumper and the link rod means move toward the other bumper, so as to simultaneously actuate said pair of hydraulic damper means. As a result, the apparent bumper stroke is doubled, as compared with that of single damper shock absorber, without increasing the distance between the two bumpers.

A SECOND EXAMPLE, U.S. Pat. No. 3,833,248 to Wossner et al. teaches telescoping shock absorbers that are arranged between the frame and bumper bar of an automotive vehicle in such a manner that the piston of each shock absorber moves inward of the cylinder under the impact of a collision, and liquid flows through a restricted passage between the compartments of the cylinder cavity to reduce the velocity of cylinder movement. If the passage is a groove in the inner cylinder wall, its flow section decreases in the direction of inward piston movement in such a manner that the force opposing the piston movement remains substantially constant even though the velocity of cylinder movement decreases. The same result can be achieved by forming the restricted passage in the piston, and biasing a valve member on the piston toward the passage closing position by a heavily prestressed cup spring or helical spring.

A THIRD EXAMPLE, U.S. Pat. No. 3,947,061 to Ellis teaches a bumper for motor vehicles which is operated by hydraulic slave cylinders connected to the master brake cylinder to extend the bumper upon the application of a predetermined amount of force to the brake to provide the bumper with a greater shock absorbing length of travel under collision conditions while permitting the retraction of the bumper to facilitate in town maneuvering and parking under normal driving conditions.

A FOURTH EXAMPLE, U.S. Pat. No. 4,046,361 to Morse teaches a device for cushioning the impact of an approaching article that comprises a lever arm adapted to be attached to shock absorbing means and extend across the path of travel of the article, said arm having a surface on the side nearest the article so curved that the distance between the point of impact of the article againt the lever and the point of attachment of the lever to the shock-absorber decreases as the article advances after the first contacting said lever.

A FIFTH EXAMPLE, U.S. Pat. No. 4,546,959 to Tanno teaches a hydraulic shock absorber comprising a cylinder containing a working oil; piston received in a slidable manner in the cylinder and formed with a communication passage for generating a damping force, a piston rod protruding from one end of the cylinder; a valve chamber formed at the other end of the cylinder in fluid communication with the inside of the cylinder; an oil tank having an oil port for communication with the valve chamber; a disc-shaped valve arranged in the valve chamber and formed with a plurality of oil holes which have different effective areas and which can selectively be brought to face the oil port which communicates with the valve chamber and oil tank when the disc-shaped valve is turned. The disc-shaped valve is preferably mounted slidably but non-rotatably upon a valve stem. A coil spring is preferably provided to urge the disc-shaped valve against the valve chamber. At the same time, the valve stem has its one end protruding to the outside, and a turn knob is mounted on the protruding end of the valve stem for turning the disc-shaped valve. The damping force under compression can be changed without difficulty by turning the turn knob.

A SIXTH EXAMPLE, U.S. Pat. No. 4,932,697 to Hum teaches a shock absorbing system for an automotive vehicle having a chassis and front and rear bumpers which are movable relative to the chassis is provided. The system comprises an hydraulic oil circuit which includes a storage tank for storing hydraulic oil, a pump for pumping hydraulic oil from the tank into the circuit and an electric motor for driving the pump. An actuator for extending or retracting the front and rear bumpers away or toward the chassis is provided downstream of the pump and comprises an upper oil chamber and a lower oil chamber, the arrangement being such that when a predetermined oil pressure is maintained in the upper chamber, the bumpers are maintained in a retracted position relative to the chassis and when the pressure is switched to the lower oil chamber, the bumpers are moved to positions in which they are extended from the chassis. A solenoid valve is provided for alternately connecting either the upper oil chamber or the lower oil chamber of the actuator to the hydraulic oil flow downstream of the pump. Switching means is provided for activating the solenoid valve. An accumulator for absorbing the pressure shock imported to the front or rear bumper due to a collision of the vehicle with another vehicle or object is included in the system. The accumulator comprises a cylinder and a piston in the cylinder dividing the cylinder into an oil chamber, which is connected to the hydraulic return line, and a gas chamber which is connected to a source of pressurized gas for cushion the shock of a collision.

A SEVENTH EXAMPLE, U.S. Pat. 5,011,205 to Liu teaches a safety vehicle bumper that includes a bumper mounted on two guide rods secured to several driving pistons reciprocating in at least one set of twin cylinders, which bumper can be operatively extended outwardly to prevent a close hit on a car body by another object by deeply treading a brake pedal for pneumatically or hydraulically moving the piston and the secured guide rods and the bumper outwardly for safety purpose.

AN EIGHTH EXAMPLE, U.S. Pat. No. 5,029,919 to Bauer teaches a pneumatic energy absorbing arrangement, for use between the bumper and the frame of an automobile, that includes a piston and cylinder combination which provides for an increasing amount of force or energy absorbed in relation to an increasing amount of travel between the piston and cylinder combination and, therefore, of the automobile itself. Exhaustion of the air with the piton cylinder combination is accomplished by a decreasing area of vent holes as the travel of the piston and cylinder increases. A specific or variable rate spring is provided to bias the piston and cylinder arrangement in an extended before-impact condition and absorb energy. The energy absorption device provided by this invention is reusable in that it is not destroyed during an impact.

A NINTH EXAMPLE, U.S. Pat. No. 5,031,947 to Chen teaches a vehicular bumper assembly that is formed of an outer bumper with one or more arcuate faces and one or more resilient pipes having outer surfaces conforming to the arcuate faces. The pipes are located adjacent to the faces and serve a buffering function when the outer bumper moves rearwardly in a collision. A buffer spring assembly absorbs an initial first portion of a collision force. The pipes then absorb a second portion of the collision force. The assembly also has a touch switch for enabling the vehicle's horn during a collision.

A TENTH EXAMPLE, U.S. Pat. No. 5,101,927 to Murtuza teaches an automatic brake actuation system for use on a vehicle having an existing braking system including an elongate detector mounted to the vehicle and being controllably extendable from the vehicle to contact objects being approached by the vehicle when at predetermined distances therefrom. A compression sensor is included to sense contact between the elongate detector and an object. Provision is also made to sense vehicle speed, vehicle-object closing speed, and detector position and to extend and retract the detector and actuate the vehicle braking system in response thereto.

AN ELEVENTH EXAMPLE, U.S. Pat. No. 5,370,429 to Reuber et al. teaches a bumper system including an extendable bumper resiliently disposed in the direction of impact. The system is compact and, even at elevated impact speeds, protects the automotive vehicle against damage. The bumper is extended by an adequate amount before or during the situation of danger. A progressive damping characteristic and a suitable drive to quickly extend and to safely return the bumper are provided.

A TWELFTH EXAMPLE, U.S. Pat. No. 5,593,195 to Lai teaches an impact moderating mechanism for automobiles comprising a pair of identical bump wave absorbing and transferring devices at two ends of a chassis respectively. Each of the bump wave absorbing and transferring devices have an outer bumper, a pair of first hydraulic cylinders, a pair of second hydraulic cylinders and a plurality of conduits thereof connected therebetween, which devices can functionally absorb a certain amount of bump wave firstly at one end, then transfers a large portion of the bump wave to be eliminated in the other end. A cross arrangement of the conduits for the first hydraulic cylinders thereinbetween can prevent an automobile subject to an impact from being swung and/or overturned. Furthermore, the absorbing capacity of bump wave shall be doubled for each of the collision automobiles if they are both equipped with this impact moderating mechanism.

A THIRTEENTH EXAMPLE, U.S. Pat. No. 5,951,073 to Hall teaches a new extendable vehicle bumper for warning a driver of a vehicle that their vehicle is coming close to contact with an object such as a wall or another vehicle. The inventive device includes an elongate contact bumper with a plurality of telescopic fluidic piston-cylinder actuators coupled to one side of the contact bumper. Each of the telescopic fluidic piston-cylinder actuators has a mounting portion for attachment to the bumper area of a vehicle. A remote controller is electrically connected to the telescopic fluidic piston-cylinder actuator. The remote controller has an actuator and a warning indicator. The actuator of the remote controller permits selective extending and retracting of the telescopic fluidic piston-cylinder actuators. The warning indicator warns a user when the telescopic fluidic piston-cylinder actuators are pushed from the extended position towards the retracted position by the contact bumper.

A FOURTEENTH EXAMPLE, U.S. Pat. No. 5,959,552 to Cho teaches a system of minimizing roadway vehicle damage and personal injury which includes a detection sensor unit, a computer processing unit (CPU), and energy absorbing inflation devices. The detection sensor unit, which is mounted on the roadway vehicle to detect the speed, distance and direction of a potential obstacle, includes a transmitter for transmitting signals and a directional receiver to receive signals reflected by the potential obstacle and generates an electronic signal in response thereto. The CPU, which receives information on the speed and direction of the roadway vehicle and receives signals from the detection sensor unit continuously processes the information and signals and calculates changes in the speed, distance and direction of the potential obstacle with respect to the roadway vehicle. The CPU generates a control signal upon calculation of an imminent collision situation, which calculation is based on a predetermined minimum allowable time window. The minimum allowable time window is generally defined as a time period during which a driver of the roadway vehicle is unable to take evasive action, such as braking or turning the steering wheel, to avoid a collision situation. Each of the energy absorbing inflation devices includes an electronically controlled valve, with at least one of the energy absorbing inflation devices being responsive to the control signal. An external air bag is coupled to the valve of one of the energy absorbing inflation devices and an internal air bag is coupled to the valve of another of the inflation devices, such that upon calculation by the CPU of the imminent collision situation based on the predetermined minimum allowable time window, the CPU transmits the control signal to one of the energy absorbing inflation devices to deploy the air bags prior to the time of actual collision.

A FIFTEENTH EXAMPLE, U.S. Pat. No. 5,967,573 to Wang teaches a motor vehicle bumper energy absorber including an outer tube on a body of the motor vehicle, an inner tube and a bumper bar supported on the outer tube for linear translation between a retracted position and an extended position, an actuator for translating the inner tube and bumper bar, and a resistance medium for converting into work a fraction of the kinetic energy of an impact on the bumper bar. The actuator includes a shuttle on the inner tube, an actuator rod connected to the shuttle, and a plurality of spheres in wedge-shaped grooves in the inner tube. The actuator rod pushes the shuttle against the inner tube to translate the bumper bar from its retracted to its extended position. An impact on the bumper bar in its extended position causes the spheres to wedge against the outer tube. The actuator rod pulls the shuttle against the inner tube to translate the bumper from its extended position to its retracted position while fingers on the shuttle engage the spheres and prevent wedging of the latter against the outer tube. The wedged spheres constitute a resistance medium by plowing tracks in the outer tube.

It is apparent that numerous innovations for bumpers have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a bumper for a motor vehicle that avoids the disadvantages of the prior art.

ANOTHER OBJECT of the present invention is to provide a bumper for a motor vehicle that is simple and inexpensive to manufacture.

STILL ANOTHER OBJECT of the present invention is to provide a bumper for a motor vehicle that is simple to use.

BRIEFLY STATED, STILL YET ANOTHER OBJECT of the present invention is to provide a bumper for a motor vehicle that includes a frame attached to the motor vehicle, a covering that covers the frame, and at least one set of self contained gas springs that are for attaching to the motor vehicle. The at least one set of self contained gas springs supporting the frame allows transition of acceleration to be smoothed, both upon initial contact of the bumper until its maximum compression, and between maximum compression of the bumper and end-deformation of the motor vehicle, while lowering deformation to the motor vehicle and shock to its passengers and lowering overall compression distance in the bumper to save the motor vehicle from further damage. The at least one set of self contained gas springs raises deceleration of impact during compression of the bumper, but lowers deceleration during deformation of the motor vehicle.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

DESCRIPTION OF THE DRAWING

The figures of the drawing are briefly described as follows:

FIG. 1 is a diagrammatic perspective view of the present invention;

FIG. 2 is a generalized analog diagram thereof;

FIG. 3 is a graph of force versus displacement distance for the associated analog diagram of FIG. 2;

FIG. 4 is a graph of force versus displacement distance for the embodiment illustrated in FIG. 1; and FIG. 5 is a graph of force versus displacement distance of a conventional prior art bumper.

LIST OF REFERENCE NUMERALS UTILIZED IN THE DRAWING 10 bumper of present invention for motor vehicle 12
12 motor vehicle
14 frame of motor vehicle 12
16 frame for attaching to frame 14 of motor vehicle 12
18 covering
20 at least one set of self contained gas springs

DESCRIPTION OF THE PREFERRED EMBODIMENT

Referring now to the figures, in which like numerals indicate like parts, and particularly to FIG. 1, the bumper of the present invention is shown generally at 10 for a motor vehicle 12, wherein the motor vehicle 12 has a frame 14.

The bumper 10 comprises a frame 16 for attaching to the frame 14 of the motor vehicle 12, a covering 18 that covers the frame 16, and at least one set of self contained gas springs 20 that are for attuning to the frame 14 of the motor vehicle 12. Self contained gas springs of the type described in this disclosure are are available for purchase in various sizes and parameters from, KALER(R) GAS SPRINGS, 33382 Grosebeck Highway, Fraser, Mich. 48026, Voice: 888–20–7190, Fax: 810–415–6699.

The frame 16 is curved, C-channel-shaped, and made of steel.

The covering 18 is made of plastic.

The at least one set of self contained gas springs 20 are three to four evenly spaced-apart sets of self contained gas springs.

The theory behind the bumper 10 lies in the kinetic energy of the motor vehicle 12 Just before impact being a variable (specifically velocity) to provide an input of pressure to the at least one set of self contained gas springs 20. The constants of the theory of the bumper 10 are the estimated weight of the motor vehicle 12 with four 150 lb. passengers.

Each set of the at least one set of self contained gas springs 20 comprises three or four individual self contained gas springs.

All cylinders of each set of the at least one set of self contained gas springs 20 are attached to the frame 14 of the motor vehicle 12, while only one of the cylinders of each set of the at least one set of self contained gas springs 20 is attached to the frame 16 of the motor vehicle 12 prior to impact. The other cylinders of each set of the at least one set of self containe gas springs 20 are progressively shorter than the only one of the cylinders of each set of the at least one set of self contained gas springs 20, yielding a staggered configuration of the cylinders of each set of the at least one set of self contained gas springs 20.

Upon impact, the only one cylinder of each set of the at least one set of self contained gas springs 26 compresses, followed by an adjacent cylinder of each set of the at least one set of self contained gas springs 20, and so on. Such a system of self contained gas springs allows for a transitory stiffening of the frame 16 during compression, instead of a spike in stiffness as in a conventional system.

At all times before impact, each cylinder of the at least one set of self contained gas springs 20 is at full extension. Only upon impact does the at least one set of self contained gas springs 20 compress.

The bumper 10 may be manufactured to allow for extra travel compared to conventional designs to allow for more distance to dissipate the energy of motion.

During an impact, acceleration of all components of the motor vehicle 12 and its passengers is an important issue in damage and injury. By using the at least one set of self contained gas springs 20 to support the bumper frame 16, the transition of acceleration felt between two intervals will be smoothed, both upon initial contact of the bumper 10 until its maximum compression, and between maximum compression of the bumper 10 and end-deformation of the motor vehicle 12.

The at least one set of self contained gas springs 20 can be thought of as a dynamically stiffening spring as opposed to a soft static spring as in conventional bumper designs.

At any speed, the energy of motion (kinetic energy) of the motor vehicle 12 and its passengers can be expressed as:

$$KE = \frac{1}{2}mv^2$$

where:
KE is the kinetic energy of the loaded motor vehicle 12
m is the mass of the loaded motor vehicle 12
v is velocity of the loaded motor vehicle 12

This energy, upon impact, will be transmitted to compressing the at least one set of self contained gas springs 20 and deforming the frame 14 of the motor vehicle 12.

The energy stored in a compressed spring can be expressed as:

$$U_{spring} = \frac{1}{2}kx^2$$

where:
k is the stiffness of a spring;
X in the distance traveled during compression.

Equating the energy of a spring to the kinetic energy dissipated (change in kinetic energy) yields a relationship between the velocity change ($v_f$-$v_i$) of the motor vehicle 12, the distance that the bumper 10 has been compressed (x), and the stiffness needed of the at least one set of self contained Mas springs 20 (k).

$$k = \frac{m(v_i^2 - v_f^2)}{x^2}$$

The work of deforming only the at least one set of self contained gas springs 20 is the change in kinetic energy:

$$W = \Delta KE = Fd$$

where:
W is work
F is force
d is the distance or length of travel of the at least one set of self contained gas springs 20.

As shown in FIGS. 2 and 3, with increasing stiffness from subsequently activated springs, the force-displacement curve transitions more smoothly, i.e. stiffness of the bumper 10 increases when each spring is subsequently compressed.

According to this relationship, the stiffer the spring value, or similarly, cylinder pressure, the greater the acceleration. This system will raise the deceleration of impact during compression of the bumper 10, however, will lower the deceleration during deformation of the motor vehicle 12. This latter impact is the more detrimental portion to human and the motor vehicle 12 because of the increased stiffness.

FIGS. 4 and 5 indicate this difference in the slopes, detailing the efficacy of the bumper 10.

FIGS. 4 and 5 are graphs of force versus distance. FIG. 4 depicts a conventional design with a sharp increase in acceleration during the compression of the motor vehicle 12, while FIG. 5 depicts the bumper 10 smoothing out the transition between full compression of the bumper 10 and deformation of the motor vehicle 12 while lowering the deformation as well. The area underneath each curve is the work energy of compressing the at least one set of self contained gas springs 20, which is the same. This smoothing effect of the transition will lower the shock to passengers.

The slope of the compression of the motor vehicle 12 segment in both curves is the same, however, there is less overall compression distance in the bumper 10, thus saving the motor vehicle 12 from further damage.

It will be understood that each of the elements described above, or two or more together, may also find a useful application in other types of constructions differing from the types described above.

While the invention has been illustrated and described as embodied in a bumper for a motor vehicle, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A bumper for a motor vehicle, wherein the motor vehicle has a frame, said bumper comprising:
   a) a frame;
   b) a covering; and
   c) at least one set of self contained gas springs;
      wherein said frame is for attaching to the frame of the motor vehicle;
      wherein said covering covers said frame; and
      wherein said at least one set of self contained gas springs are for attaching to the frame of the motor vehicle;
      wherein said at least one set of self contained gas springs supporting said frame allows transition of acceleration to be smoothed, both upon initial contact of said bumper until its maximum compression, and between maximum compression of said bumper and end-deformation of the motor vehicle, while lowering deformation to the motor vehicle and shock to its passengers and lowering overall compression distance in said bumper to save the motor vehicle from further damage; and
      wherein said at least one set of self contained gas springs raises deceleration of impact during compression of said bumper, but lowers deceleration during deformation of the motor vehicle, wherein only one cylinder of each set of said at least one sest of self contained gas springs is attached to the bumper frame of the motor vehicle during pre-impact, wherein the other cylinders of each set of said at least one set of self contained gas spreings are progressively shorter than said only one cylinder of each set of said at least one set of self contained gas springs so upon impact said only one cylinder of each set of said at least one set of self contained gas springs compression first, followed by an adjacent cylinder of each set of said at least one set of self contained gas springs, and so on, so as to form a transitory stiffening of said bumper frame during compression, instead of a spike in stiffness as in a conventional system.

2. The bumper as defined in claim 1, wherein said bumper frame is curved.

3. The bumper as defined in claim 1, wherein said bumper frame is C-channel-shaped.

4. The bumper as defined in claim 1, wherein said bumper frame is made of steel.

5. The bumper as defined in claim 1, wherein said covering is made of plastic.

6. The bumper as defined in claim 1, wherein said at least one set of self contained gas springs are three evenly spaced-apart sets of self contained gas springs.

7. The bumper as defined in claim 1, wherein said at least one set of self contained gas springs are four evenly spaced-apart sets of self contained gas springs.

8. The bumper as defined in claim 1, wherein each set of said at least one set of self contained gas springs comprises three individual self contained gas springs.

9. The bumper as defined in claim 1, wherein each set of said at least one set of self contained gas springs comprises four individual self contained gas springs.

10. The bumper as defined in claim 1, wherein the cylinders of each set of said at least one set of self contained gas springs are staggered.

* * * * *